United States Patent
Wright

(12)
(10) Patent No.: US 6,195,635 B1
(45) Date of Patent: Feb. 27, 2001

(54) USER-CUED SPEECH RECOGNITION

(75) Inventor: Barton D. Wright, Auburndale, MA (US)

(73) Assignee: Dragon Systems, Inc., Newton, MA (US)

( * ) Notice: Subject to any disclaimer, the term of this patent is extended or adjusted under 35 U.S.C. 154(b) by 0 days.

(21) Appl. No.: 09/130,342

(22) Filed: Aug. 13, 1998

(51) Int. Cl.[7] ................................................. G10L 15/00
(52) U.S. Cl. ........................ 704/231; 704/235; 704/275
(58) Field of Search ................................. 704/270, 275, 704/235, 231

(56) References Cited

U.S. PATENT DOCUMENTS

| 4,355,302 | 10/1982 | Aldefeld et al. . |
|---|---|---|
| 4,674,065 | 6/1987 | Lange et al. . |
| 4,783,803 | 11/1988 | Baker et al. . |
| 4,805,218 | 2/1989 | Bamberg et al. . |
| 4,805,219 | 2/1989 | Baker et al. . |
| 4,829,576 | 5/1989 | Porter . |
| 4,833,712 | 5/1989 | Bahl et al. . |
| 4,866,778 | 9/1989 | Baker . |
| 4,914,704 | 4/1990 | Cole et al. . |
| 4,931,950 | 6/1990 | Isle et al. . |
| 5,027,406 | 6/1991 | Roberts et al. . |
| 5,031,217 | 7/1991 | Nishimura . |
| 5,033,087 | 7/1991 | Bahl et al. . |
| 5,036,538 | 7/1991 | Oken et al. . |
| 5,202,952 | 4/1993 | Gillick et al. . |
| 5,231,670 | 7/1993 | Goldhor et al. . |
| 5,329,609 | 7/1994 | Sanada et al. . |
| 5,377,303 | 12/1994 | Firman . |
| 5,386,494 | 1/1995 | White . |
| 5,428,707 | 6/1995 | Gould et al . |
| 5,497,373 | 3/1996 | Hulen et al. . |
| 5,632,002 | 5/1997 | Hashimoto et al. . |
| 5,754,972 | 5/1998 | Baker et al. . |
| 5,765,132 | 6/1998 | Roberts et al. . |
| 5,794,189 | * 8/1998 | Gould .................................. 704/231 |

OTHER PUBLICATIONS

HARK™ Prototyper Programmer's Guide, Release 2.0, Jun. 1994, Bolt Beranck and Newman, Inc., pp3–14 and 3–15 and XV.*

* cited by examiner

Primary Examiner—David D. Knepper
(74) Attorney, Agent, or Firm—Fish & Richardson

(57) ABSTRACT

Recognition of speech by a speech recognizer is improved by receiving deliberately contiguously repeated spoken utterances corresponding to a speech element and recognizing fewer instances of the speech element than the number of repeated spoken utterances. If a spoken utterance corresponding to the speech element is received and misrecognized prior to receiving the deliberately contiguously repeated spoken utterances, the spoken utterance and the repeated spoken utterances may be used to recognize the speech element.

27 Claims, 6 Drawing Sheets

USER-CUED SPEECH RECOGNITION

BACKGROUND

This invention relates to computer-implemented speech recognition.

A typical speech recognition system includes a recognizer and a stored vocabulary of words which the recognizer can recognize. The recognizer receives information about utterances, and delivers a corresponding recognized word or string of recognized words drawn from the vocabulary.

Speech recognition systems, which sometimes misrecognize speech, also provide ways for users to correct recognition errors. In a simple case, the user deletes an incorrect word and types a replacement. In some systems, selecting an incorrect word triggers the display of a list of alternative words from which the user may select a replacement. Selecting the incorrect word also may trigger a prompt to the user to speak the misrecognized utterance again, perhaps more slowly and clearly. The misrecognized word is then replaced with the result of recognizing the new utterance spoken by the user.

SUMMARY

In one aspect, recognition of speech by a speech recognizer may be improved by receiving deliberately contiguously repeated spoken utterances corresponding to a speech element, and recognizing fewer instances of the speech element than the number of repeated spoken utterances. The speech element may be, for example, a word, a phrase, or a sentence.

At least one of the repeated spoken utterances may be spoken by a user after misrecognition of another one of the repeated spoken utterances is apparent. An instance of the speech element may be recognized for each of the repeated spoken utterances if the speech element is in a predetermined class of speech elements. The predetermined class may include, for example, speech elements which may properly be repeated in a language recognized by the speech recognizer or commands.

Prior to receiving the deliberately contiguously repeated spoken utterances, a spoken utterance corresponding to the speech element may be received and misrecognized. The spoken utterance and the repeated spoken utterances may be used to recognize the speech element.

Recognizing the speech element may include identifying possible recognized speech elements for the repeated spoken utterances and selecting one of the possible recognized speech elements as a recognized speech element. Selecting one of the possible recognized speech elements as a recognized speech element may include developing scores for the possible recognized speech elements and selecting as the recognized speech element a possible recognized speech element with an optimal score. Possible recognized speech elements may be identified for a predetermined number of the repeated spoken utterances.

Recognizing the speech element may include applying a recognition process directly to representations of speech utterance waveforms for at least two of the repeated spoken utterances without separately recognizing a speech element for each of the spoken utterances.

Among the advantages of the invention are one or more of the following.

Deliberately repeating a word, phrase, or sentence decreases the likelihood that the word, phrase, or sentence will be misrecognized. Time spent by the user correcting recognition errors is decreased as fewer recognition errors occur. Because the time needed to repeat a word, phrase, or sentence is typically small compared to the time required to correct a recognition error, overall recognition time is decreased. Furthermore, because a user must typically stop speaking in order to correct a recognition error, a reduction in the number of recognition errors allows the user to speak naturally for longer periods of time.

Another advantage of the invention is that it provides the user with a degree of interactive control over the accuracy of speech recognition. The user may, for example, increase the likelihood that selected words will be recognized correctly by deliberately repeating the selected words, without interrupting the flow of speech. The likelihood that the selected words will be recognized correctly may increase in proportion to the number of repetitions.

Similarly, another advantage of the invention is that it increases the accuracy of error correction. If a word is misrecognized, the user may repeat the word more than once. The likelihood that the misrecognized word will be replaced with the correct word may increase in proportion to the number of repetitions. This decreases the likelihood that the attempt at error correction will fail, requiring the user to attempt error correction again.

The techniques may be implemented in computer hardware or software, or a combination of the two. However, the techniques are not limited to any particular hardware or software configuration; they may find applicability in any computing or processing environment that may be used for speech recognition. Preferably, the techniques are implemented in computer programs executing on programmable computers that each include a processor, a storage medium readable by the processor (including volatile and nonvolatile memory and/or storage elements), at least one input device, and one or more output devices. Program code is applied to data entered using the input device to perform the functions described and to generate output information. The output information is applied to the one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system may also be considered to be implemented as a computer-readable storage medium, configured with a computer program, where the storage medium so configured causes a computer to operate in a specific and predefined manner.

Other features and advantages of the invention will become apparent from the following description, including the drawings, and from the claims.

DETAILED DESCRIPTION

Figure 1:
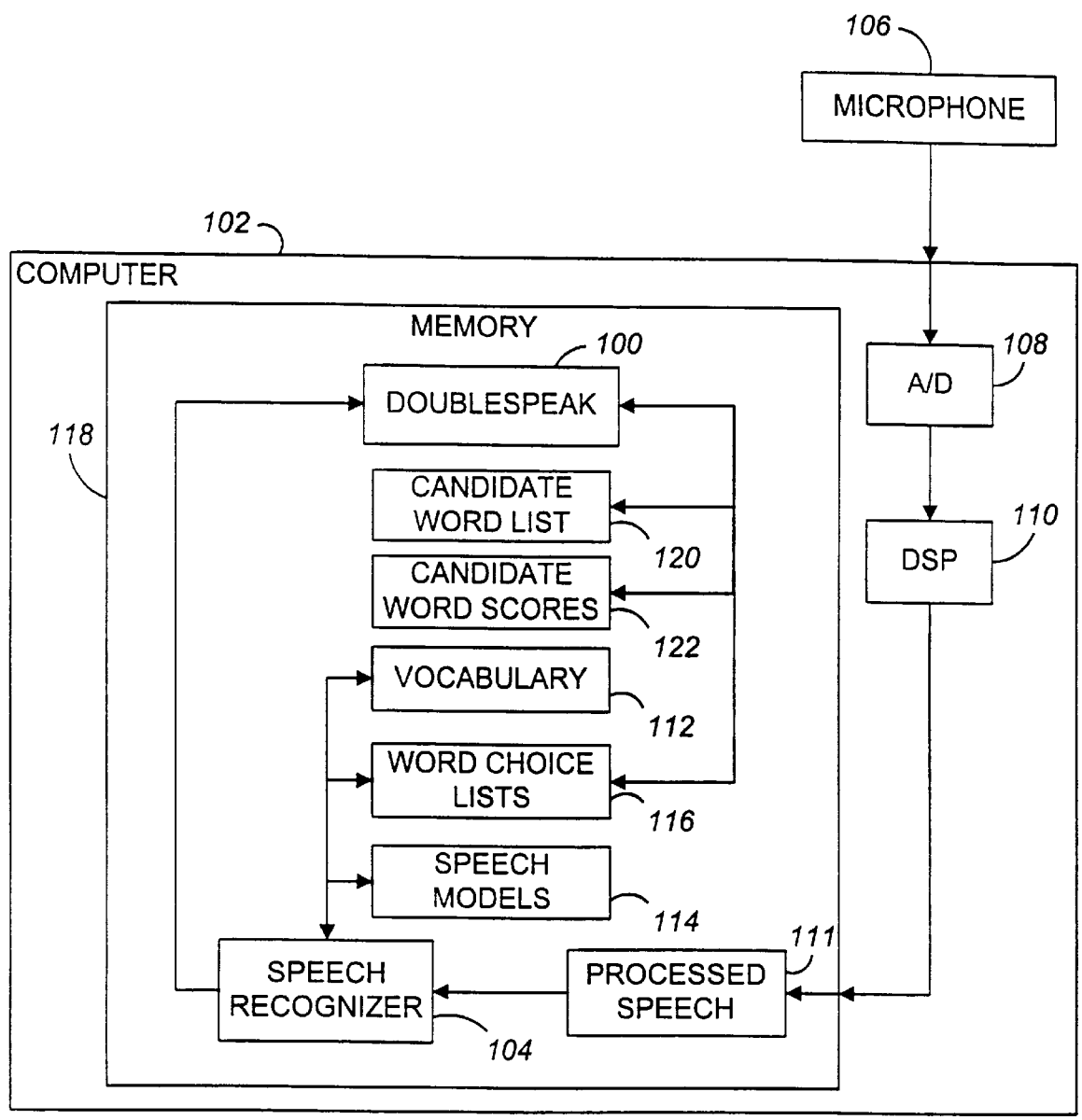
FIG. 1 is a block diagram of a computer.

Referring to FIG. 1, a computer 102 executes a doublespeak application 100 which responds to spoken cues of the user to improve recognition of speech elements (such as words, phrases, or sentences) by a speech recognizer process 104. When a user wishes to improve recognition of a speech element by the speech recognizer process 104, the user conveys additional speech information by speaking the speech element two or more times consecutively. The doublespeak application 100 uses this repetition to improve recognition of the speech element.

When the user speaks into a microphone 106, analog signals representing the user's speech are sent to the computer 102, converted from analog into digital form by an analog-to-digital (A/D) converter 108, and processed by a digital signal processor (DSP) 110. The signals are stored as processed speech 111 in memory 118. A speech recognizer process 104, which may be part of, for example, NaturallySpeaking™ available from Dragon Systems, Inc. of West Newton, Mass., identifies the start and end of each spoken utterance (e.g., a word or a sentence) within the processed speech 111, and compares the processed speech 111 to speech models 114 of words in the vocabulary 112 to generate word choice lists 116 for the processed speech 111. The words in the word choice lists 116 are words, drawn from the vocabulary 112, which the speech recognizer process 104 has identified as possible matches for part or all of the processed speech 111. Word choice lists 116 are stored in memory 118 and ordered such that the most likely correct word choice, as determined by the recognizer process 104, is at the top of the choice list.

To enable the speech recognizer process 104 to recognize repetition of a word as a single instance of the word, a "double" speech model for the word is added to the speech models 114. This model represents a repetition of the word and corresponds to a vocabulary entry for a single instance of the word in the vocabulary 112. For example, the speech models 114 include a speech model of the utterance "move move," corresponding to an entry in the vocabulary 112 for the word "move."

For purposes of the following discussion, consider an example in which the user, intending to speak the sentence "Move back three spaces," anticipates that the speech recognizer process 104 may misrecognize the word "move." To increase the likelihood that the word "move" will be correctly recognized, the user deliberately repeats the word "move" by saying "Move move back three spaces."

As described above, the spoken sentence "Move move back three spaces" is processed and stored as processed speech 111. The speech recognizer process 104 compares the processed speech 111 to speech models 114 of words in the vocabulary 112. As a result, the speech recognizer process 104 may determine that the speech frames corresponding to the spoken words "move move" match both (1) the speech model for "move move" (which, as described above, corresponds to a vocabulary entry for the single word "move") and (2) two instances of the speech model for "move."

The speech recognizer process 104 is configured to prefer recognizing an utterance as a single word when faced with recognizing an utterance which matches both a single word and multiple words. For example, if an utterance matches both the speech model for the compound word "piecemeal" and the speech models for the words "piece" and "meal," the speech recognizer process 104 is configured to prefer recognizing the utterance as the single compound word "piecemeal." As a result, the speech recognizer process 104 will prefer recognizing the utterance "move move" as the single word "move" (which corresponds to the speech model for "move move"), over recognizing the utterance as words "move" and "move." To achieve this preference, "double" speech models, such as the speech model for "move move," may have a bonus score specifically associated with them, making it more likely that the speech recognizer will recognize repetition of a word, such as "move move," as a single word rather than as two consecutive occurrences of the same word.

Figure 2:
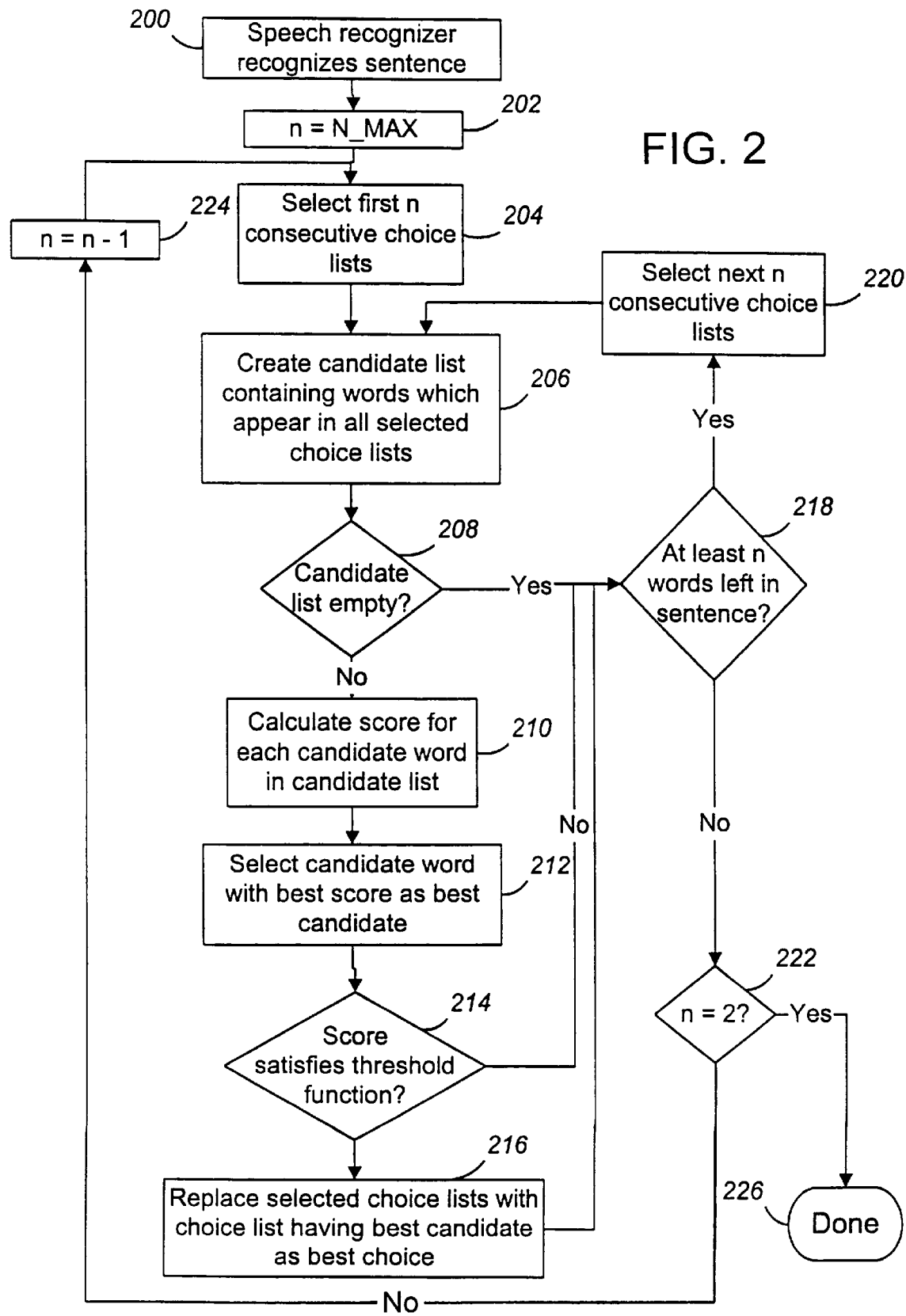
FIG. 2 is a flow chart of a method for improving recognition of a word.
Figure 3:
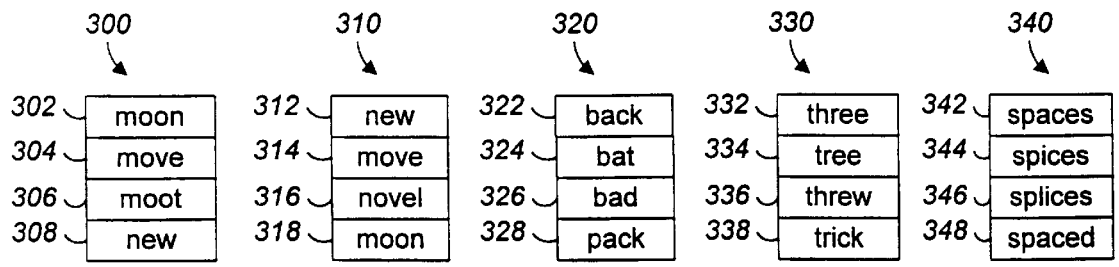
FIG. 3 is a block diagram of word choice lists.

Referring to FIG. 2, the doublespeak application 100 also may be used to improve recognition of words deliberately repeated by the user. The speech recognizer process 104 recognizes the sentence spoken by the user and produces the word choice lists 116 (step 200). For example, referring to FIG. 3, the speech recognizer process 104 may produce the word choice lists 300, 310, 320, 330, and 340 as a result of recognizing the spoken sentence "Move move back three spaces." As shown in FIG. 3, the most likely correct word choice in choice list 300 is choice 302 ("moon"). Similarly, the most likely correct word choices in choice lists 310, 320, 330, and 340 are choices 312 ("new"), 322 ("back"), 332 ("three"), and 342 ("spaces"), respectively.

The doublespeak application 100 attempts to identify words deliberately repeated by the user and to replace them with individual words. Referring again to FIG. 2, a variable n is assigned the value N_MAX, where N_MAX is the maximum number of consecutive occurrences of a word which the doublespeak application 100 will identify as a single word (step 202). The value of N_MAX may be chosen by the user or selected in any other appropriate manner. The doublespeak application 100 selects the first n consecutive word choice lists produced by the speech recognizer process 104 (step 204). For example, referring to FIG. 3, if n equals two, the doublespeak application 100 selects the choice lists 300 and 310.

Figure 4:
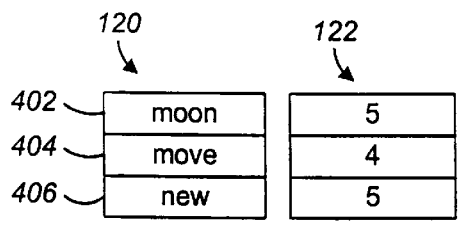
FIG. 4 is a block diagram of a candidate word list.

The doublespeak application 100 attempts to identify whether the n selected word choice lists represent a word deliberately repeated by the user. The doublespeak application 100 creates a candidate word list 120 in the memory 118 containing words which appear in all of the n selected word choice lists (step 206). For example, referring to FIG. 4, in the case of selected word choice lists 300 and 310, the doublespeak application 100 creates the candidate word list 120, containing the words "moon," "move," and "new."

If the candidate word list 120 is not empty (decision step 208), then the doublespeak application 100 calculates candidate words scores 122 for the candidate words 402–406 in the candidate word list 120 (step 210). A candidate word's score may be a function of the candidate word's ranking in each of the selected word choice lists in which it appears. For example, the first word ("moon") in the candidate word list 120 appears as the first word 302 in the word choice list 300 and as the fourth word 318 in the word choice list 310. The score for the word "moon" may therefore be calculated as, for example, the sum of its ranking in the word choice lists 300 and 310, i.e., 5 (1+4). Candidate word scores 122 for the remaining words 404 and in the candidate word list 120 may be calculated similarly, resulting in the a score of 4 for the word "move" and a score of 5 for the word "new."

The doublespeak application 100 selects the word with the best score as the best candidate word (step 212). In the example described above, the best score is the lowest score. Therefore, the word "move," with a score of 4, would be selected as the best candidate word. If the best score satisfies a threshold function (decision step 214), all of the selected word choice lists are replaced with a single word choice list having the best candidate word as the best choice (step 216).

The threshold function is used to provide some assurance that the best candidate in fact represents a word that was deliberately repeated by the user. For example, with respect to the example described above, the threshold function may require that the lowest score be lower than a certain predetermined value. Use of such a threshold function increases the likelihood that the selected choice lists will be replaced by a single word choice list only if the selected word choice lists represent a word deliberately repeated by user.

Figure 5:
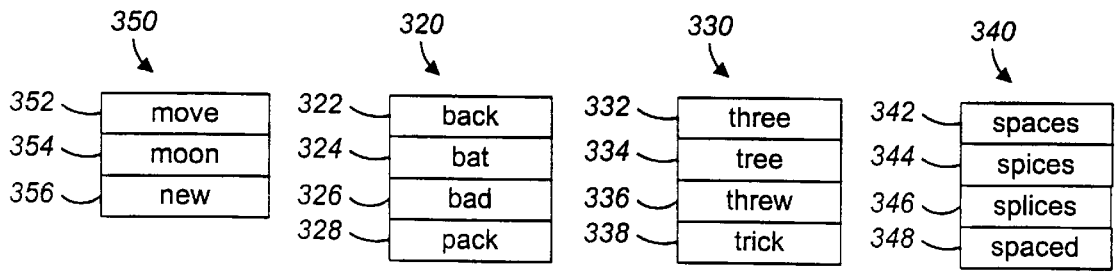
FIG. 5 is a block diagram of word choice lists.

With respect to the example above, the word choice lists 300 and 310 are replaced with the word choice list 350, as shown in FIG. 5. The first word 352 in the word choice list 350 is "move," because "move" had the best score among the words in the candidate list 400. The remaining words 354 and 356 in the word choice list 350 are ordered according to their scores, as calculated in step 210, above. The best choices of word choice lists 350, 320, 330, and 340 are now "move," "back," "three," and "spaces," respectively.

Referring again to FIG. 2, the process described above is repeated for each remaining group of n consecutive word choice lists (steps 218, 220). When each group of n consecutive word choice lists has been processed, and n is greater than two (decision step 222), n is decremented (step 224) and the process is repeated. The process terminates after each group of two or more consecutive word choice lists has been processed (steps 222, 226).

Figure 6:
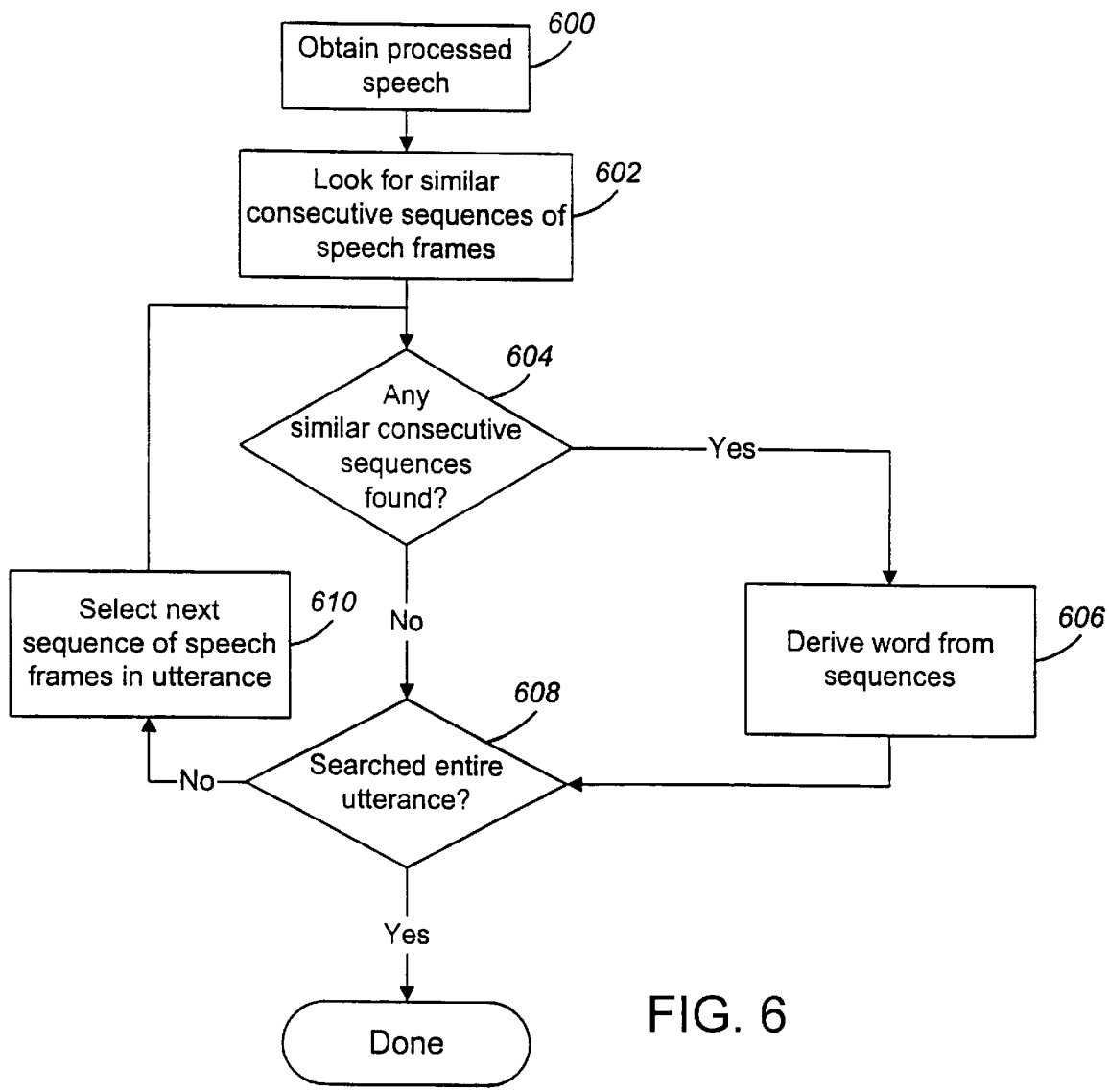
FIG. 6 is a flow chart of a method for improving recognition of a word.
Figure 7:
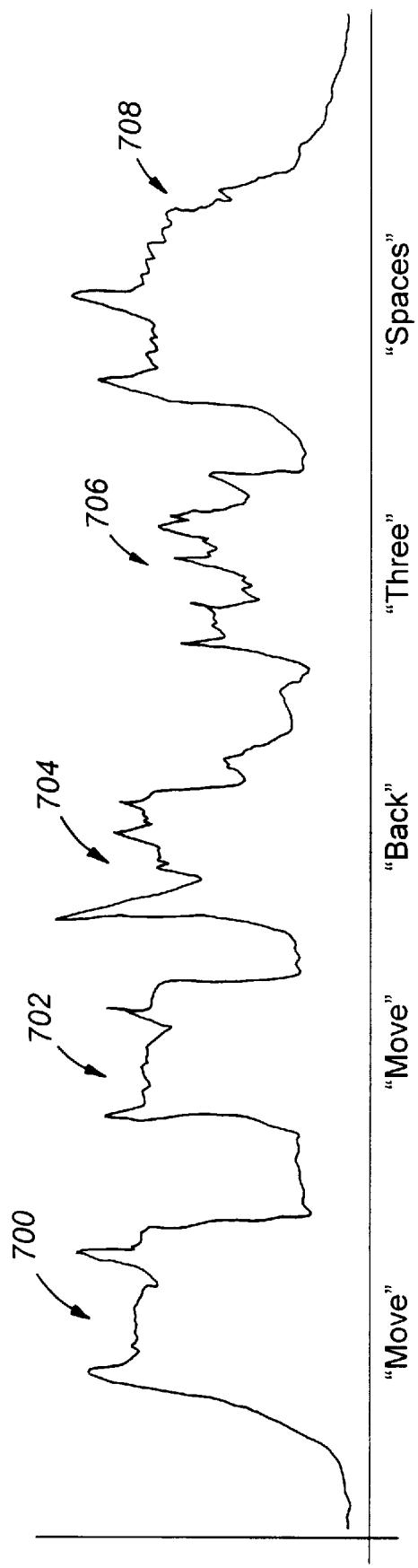
FIG. 7 is a graph of speech waveforms.

A flow chart of another method for improving recognition of words deliberately repeated by the user is shown in FIG. 6. The speech recognizer process 104 obtains processed speech 111 corresponding to one or more utterances (step 600). For example, FIG. 7 shows waveforms 700–708 corresponding to the speech "Move move back three spaces." When the user speaks "Move move back three spaces" into the microphone 106, A/D converter 108 and DSP 110 process the speech to produce processed speech 111. Processed speech 111 includes speech frames corresponding to consecutive digital samples of the user's speech.

Referring again to FIG. 6, the speech recognizer process 104 attempts to identify words deliberately repeated by the user by looking for consecutive sequences of speech frames that are similar to each other (step 602). If any such similar sequences are found (decision step 604), then the speech recognizer process 104 derives a single word from the similar sequences (step 606). For example, referring to FIG. 7, if the speech recognizer process identifies the sequences of speech frames corresponding to the waveforms 700 and 702 as being consecutive similar sequences of speech frames, then the speech recognizer process 104 derives a single word using the data represented by both of the similar sequences of speech frames. The speech recognizer process 104 continues this process until all of the processed speech 111 has been processed (steps 608, 610).

Although in the example described above a single word ("move") is repeated to improve recognition of the word, recognition of phrases and sentences may similarly be improved by repetition. For example, the user may say "Move back move back three spaces" to improve recognition of the phrase "move back," or say "Move back three spaces move back three spaces" to improve recognition of the sentence "Move back three spaces."

In some situations, words repeated by the user should be recognized as distinct words. For example, in the context of a speech-controlled word processor, the spoken words "left left left" may constitute a command for moving the cursor left three spaces. In such a case, the words "left left left" should be recognized as three distinct words. This may be accomplished by, for example, storing in memory 118 a list of words which should be recognized separately even when repeated. The list may contain, for example, words which may properly be repeated in English (e.g., "that") or words representing repeatable commands (e.g., "left").

Figure 8:
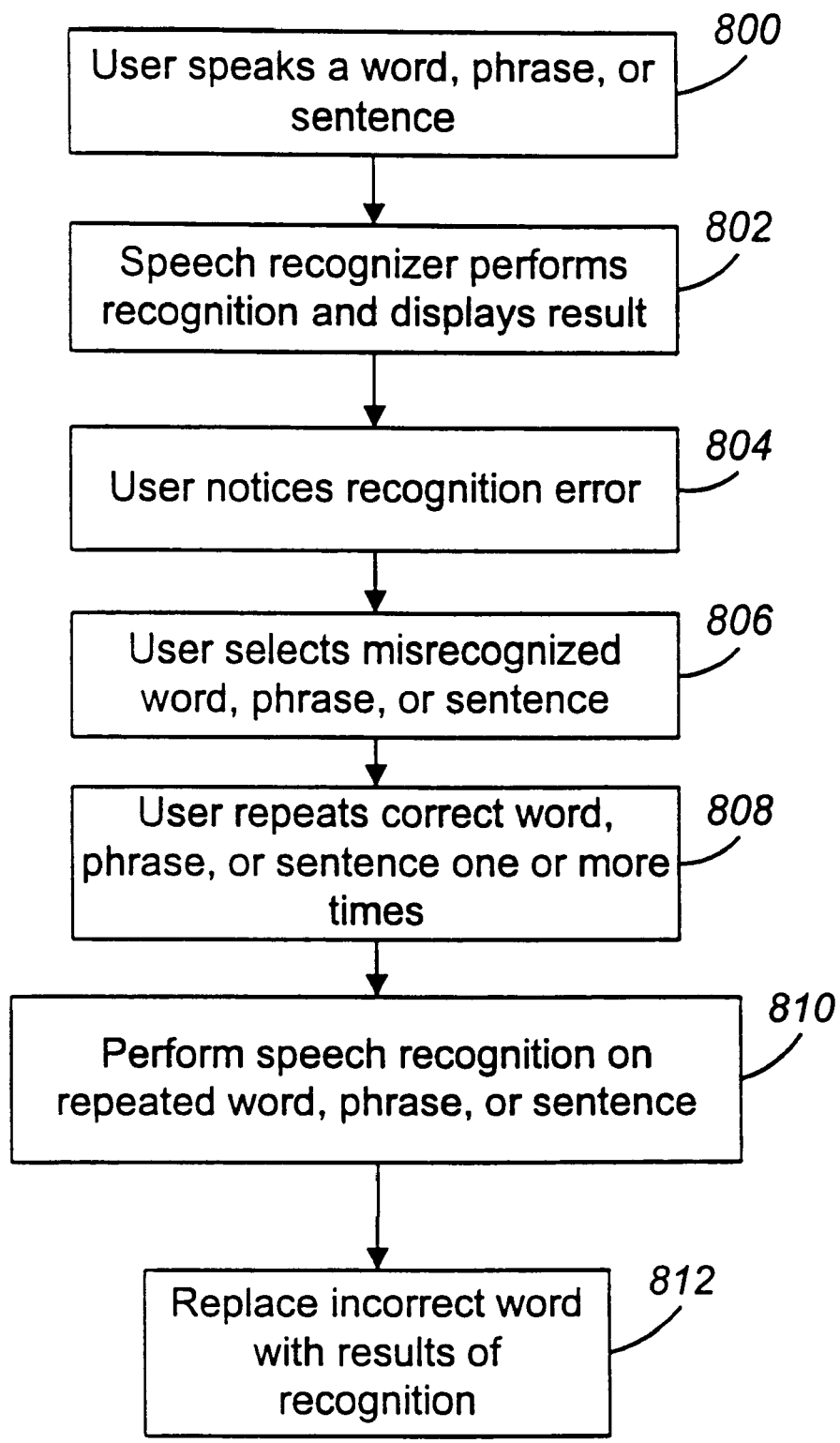
FIG. 8 is a flow chart of a method for correcting a recognition error.

The doublespeak application 100 may also use repetition of a word, phrase, or sentence to correct recognition errors after they have been made. Referring to FIG. 8, the user speaks a sentence, e.g., "Move back three spaces" (step 800). The speech recognizer process 104 performs speech recognition on the user's speech and displays the result, e.g., "Moon back three spaces" (step 802). The user notices a misrecognized word, phrase, or sentence, e.g., the word "move" has been recognized as "moon" (step 804). The user selects the misrecognized word (step 806) and repeats the correct word, phrase, or sentence one or more times, e.g., "move move move" (step 808). The speech recognizer process 104 performs speech recognition on the repeated word, phrase, or sentence (step 810) and replaces the word, phrase, or sentence selected by the user with the result of the recognition (step 812). For example, the speech recognizer process 104 may recognize the utterance "move move move" as the word "move" and replace the incorrect word "moon" with the word "move."

In addition to using a repeated word to generate a replacement for an incorrect word, the speech recognizer process 104 may use information associated with the incorrect word to generate the replacement word. The speech recognizer process 104 may, for example, examine the choice lists of the incorrect word and the repeated word to produce a more accurate choice list, as describe above with respect to FIG. 2. The best choice from such a choice list may then be selected as the replacement word.

Although in the example described above a single word ("move") within a sentence ("Move back three spaces") is repeated once to correct misrecognition of the word ("moon"), phrases and sentences may be corrected similarly. For example, if the sentence "You need to recognize speech" is incorrectly recognized as "You need to wreck a nice beach," the user may select the words "wreck a nice beach" and say "recognize recognize speech speech." The speech recognizer process 104 then performs speech recognition on "recognize recognize speech speech" to produce the replacement words "recognize" and "speech."

Although elements of the invention are described in terms of a software implementation, the invention may be implemented in software or hardware or firmware, or a combination of the three. Other embodiments are within the scope of the following claims.

What is claimed is:

1. A method for improving recognition of a speech element by a speech recognizer, comprising:

receiving deliberately contiguously repeated spoken instances of the speech element;

performing speech recognition on the spoken instances of the speech element; and producing a speech recognition result that includes only a single instance of the speech element.

2. The method of claim 1, wherein performing speech recognition on the spoken instances of the speech element comprises identifying possible recognized speech elements for the repeated spoken instances of the speech element; and producing the speech recognition result comprises selecting one of the possible recognized speech elements as a recognized speech element.

3. The method of claim 2, wherein the selecting one of the possible recognized speech elements comprises:

developing scores for the possible recognized speech elements; and selecting as the recognized speech element a possible recognized speech element with an optimal score.

4. The method of claim 3, wherein possible recognized speech elements are identified for a predetermined number of the repeated spoken instances of the speech element.

5. The method of claim 1, wherein performing speech recognition on the spoken instances of the speech element comprises applying a recognition process directly to representations of speech waveforms for at least two of the repeated spoken instances of the speech element without separately recognizing a speech element for each of the spoken instances.

6. The method of claim 1, wherein the speech element comprises a word.

7. The method of claim 1, wherein the speech element comprises a phrase.

8. The method of claim 1, wherein the speech element comprises a sentence.

9. The method of claim 1, wherein:

at least one of the repeated spoken instances of the speech element is repeated by a user after misrecognition of another one of the repeated spoken instances of the speech element is apparent.

10. The method of claim 1, further comprising:

if the speech element is in a predetermined class of speech elements, recognizing an instance of the speech element for each of the repeated spoken instances.

11. The method of claim 10, wherein the class comprises speech elements which may properly be repeated in a language recognized by the speech recognizer.

12. The method of claim 10, wherein the class comprises commands.

13. The method of claim 1, further comprising:

prior to receiving the deliberately contiguously repeated spoken instances of the speech element, receiving a spoken instance corresponding to the speech element; and misrecognizing the speech element.

14. The method of claim 13, wherein the spoken instance of the speech element and the repeated spoken instances are used to recognize the speech element.

15. A computer program tangibly stored on a computer-readable medium and operable to cause a computer to improve recognition of a speech element by a speech recognizer, comprising instructions that cause the computer to:

receive deliberately contiguously repeated spoken instances of the speech element;

perform speech recognition on the spoken instances of the speech element; and produce a speech recognition result that includes only a single instance of the speech element.

16. The computer program of claim 15, wherein instructions to perform speech recognition on the spoken instances of the speech element comprise:

instructions to identify possible recognized speech elements for the repeated spoken instances of the speech element; and instructions to produce the speech recognition result comprises instructions to select one of the possible recognized speech elements as a recognized speech element.

17. The computer program of claim 16, wherein instructions to select comprise instructions to:

develop scores for the possible recognized speech elements; and select as the recognized speech element a possible recognized speech element with an optimal score.

18. The computer program of claim 17, wherein possible recognized speech elements are identified for a predetermined number of the repeated spoken instances.

19. The computer program of claim 15, wherein instructions to perform speech recognition on the spoken instances of the speech element comprise instructions to apply a recognition process directly to representations of speech waveforms for at least two of the repeated spoken instances of the speech element without separately recognizing a speech element for each of the spoken instances.

20. The computer program of claim 15, wherein the speech element comprises a word.

21. The computer program of claim 15, wherein the speech element comprises a phrase.

22. The computer program of claim 15, wherein the speech element comprises a sentence.

23. The computer program of claim 15, wherein:

at least one of the repeated spoken instances of the speech element is repeated by a user after misrecognition of another one of the repeated spoken instances of the speech element is apparent.

24. The computer program of claim 15, further comprising instructions to:

recognize an instance of the speech element for each of the repeated spoken instances if the speech element is in a predetermined class of speech elements.

25. The computer program of claim 24, wherein the class comprises speech elements which may properly be repeated in a language recognized by the speech recognizer.

26. The computer program of claim 24, wherein the class comprises commands.

27. The computer program of claim 15, further comprising instructions to:

receive a spoken instance corresponding to the speech element prior to receiving the deliberately contiguously repeated spoken instances of the speech element; and use the spoken instance and the repeated spoken instances to recognize the speech element.

* * * * *